July 28, 1925.

E. A. GRAFSTRÖM 1,547,580

CABLE FOR ELECTRICAL MACHINES ADAPTED TO BE COILED AND UNCOILED

Filed May 14, 1919  2 Sheets-Sheet 1

July 28, 1925.
E. A. GRAFSTRÖM
1,547,580
CABLE FOR ELECTRICAL MACHINES ADAPTED TO BE COILED AND UNCOILED
Filed May 14, 1919    2 Sheets-Sheet 2
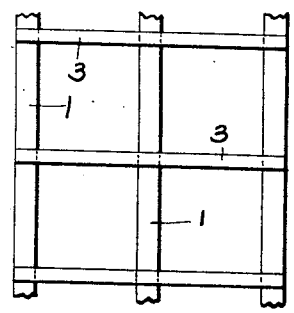
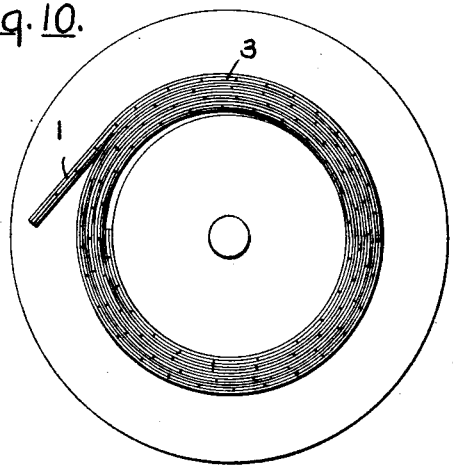
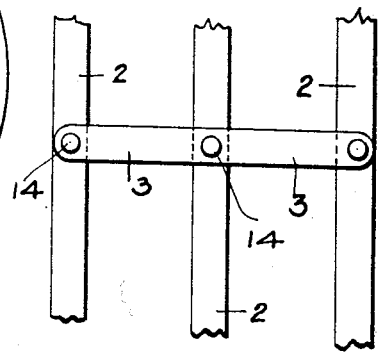
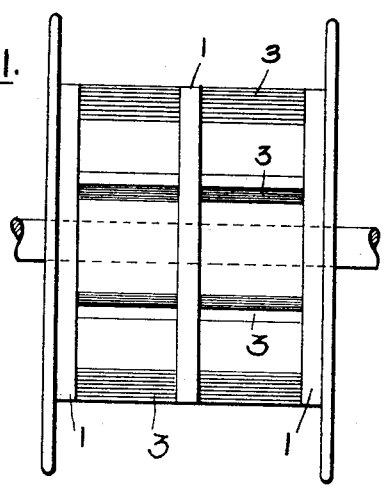
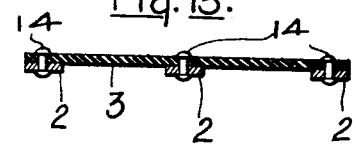

Patented July 28, 1925.

1,547,580

UNITED STATES PATENT OFFICE.

ERNST ANDERS GRAFSTRÖM, OF STOCKHOLM, SWEDEN, ASSIGNOR TO ELECTRO-AGRICULTUR AKTIEBOLAGET, OF STOCKHOLM, SWEDEN, A CORPORATION.

CABLE FOR ELECTRICAL MACHINES ADAPTED TO BE COILED AND UNCOILED.

Application filed May 14, 1919. Serial No. 297,150.

*To all whom it may concern:*

Be it known that I, ERNST ANDERS GRAFSTRÖM, subject of the King of Sweden, residing at Odengatan 32, Stockholm, in the Kingdom of Sweden, have invented certain new and useful Improvements in Cables for Electrical Machines Adapted to be Coiled and Uncoiled, of which the following is a specification.

In mobile electrical machines such as motor ploughs and similar vehicles, it has been found impracticable to use ordinary current supply cables having all cable strands embedded in the same insulation, owing to the great wear of such cables whereby the insulation will be worn out and the strands unspliced and short-circuited in a comparatively short time. Such cables are also too stiff to be readily coiled and uncoiled and, moreover, they are very heavy owing to the great amount of insulating material required in such cables.

Other cables have been suggested in which the different strands form separate and independent conductors, insulated or not, which are coiled on separate drums or cable wheels or on separate parts of a drum having three or more flanges. By this arrangement short-circuiting between different strands is obviated or, at least, rendered more difficult but there is still a considerable wear on the separate conductors from the same reason as in case of the cable of the kind first mentioned, viz, chiefly owing to the fact that on coiling up the conductors the various convolutions will not place themselves in order side by side but the conductor will be wound unevenly. Moreover, this irregular winding up of the conductor causes an unequal stretching of the uncoiled parts of the different strands whereby the latter may be brought into contact with each other causing short-circuits if the insulation has become defective by the wear or in case the conductors consist of bare wires.

All these drawbacks are overcome according to the present invention by using a cable, the different strands of which are adapted to be wound on the drum so as to form separate coils having adjacent turns laying on top of each other while said coils are kept apart by elements connecting the strands mechanically. The strands of the cable, which may consist of insulated or bare conductors, are preferably connected with each other at different points along the cable by means of stiff or rigid cross elements to form a flexible band of a rope ladder-like structure. Said cross elements may consist either of non-conducting or conducting material, in which latter case they have to be well insulated from the conductors.

By using band-shaped conductors having a large width as compared with the thickness thereof the cable obtains great flexibility and in addition thereto the pressure exerted by the various turns on each other will be uniformly distributed over all parts of the conductors whereby the wear of the cable is reduced. Another advantage with the invention is to be found therein that a single smooth cable drum with two end flanges only may be used for all strands of the cable whereby the drum construction becomes simpler and cheaper in manufacture.

Various embodiments of the invention are illustrated in the accompanying drawings.

Figs. 7 and 8 show in similar views a bare three-wire cable in which the cross elements are arranged on one side of the band-like conductors.

Fig. 9 is a side view of modification of the cable illustrated in Figs. 7 and 8, the cross elements being disposed between hand-like bare cable strands.

Fig. 10 shows a cable according to Fig. 2, the same being coiled up on a cable drum.

Fig. 11 is a front view of the same cable drum.

Fig. 12 is a detail plan showing another modified construction of my invention.

Fig. 13 is a detail sectional view of the same.

Figure 1:
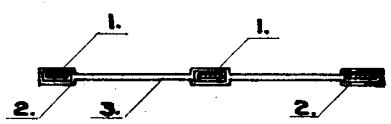
Fig. 1 shows part of a cable for three-phase alternating currents arranged in accordance with the invention.
Figure 2:
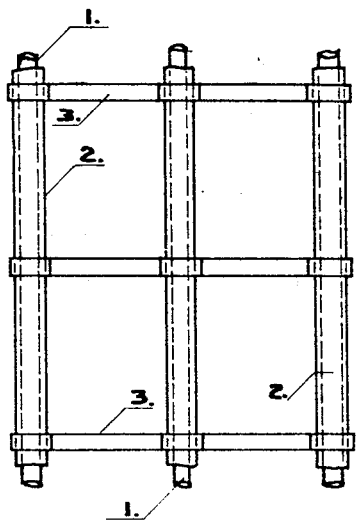
Fig. 2 shows the same in plan.

In Figs. 1 and 2, the three electrical cable strands or conductors are preferably band-shaped as in the embodiments according to Figs. 3, 4 and 7–11, that is to say they are of a very small thickness relatively to the width. The strands may consist of copper, aluminum or any other suitable current conducting metal, and they are enclosed by an insulation 2 of paper, oil-cloth or other suitable material applied next to the metal. Between the different cable strands are arranged rigid cross elements 3 which are electrically non-conducting or conducting in which latter case they have to be well insulated from the conductors 1. These elements serve as stays and insulating means between the strands, the cable as a whole having the shape of a flexible rope-ladder-like band of relatively great width and small thickness. The said cross elements keep the cable strands apart at a constant distance from each other and prevent their being torn or worn out in the coiling and uncoiling operation, the strands being compelled to assume fixed positions on top of each other, as shown in Fig. 11. Besides, the application of the cross elements and the connecting of the cables does not reduce the flexibility of every single conductor so as to prevent its being easily coiled up, and every cable strand will therefore be steadily in concentric turns so that short circuiting is obviated even in the case of bad insulation.

Figure 3:
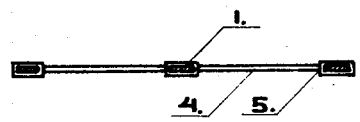
Figs. 3 and 4 show a further embodiment of such a cable in a cross-section and a plan view respectively.
Figure 4:
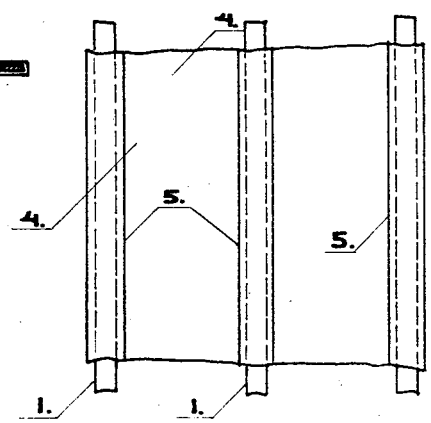

In Figs. 3 and 4, a modified embodiment of the invention is shown, the conductors 1 being bare, and the various cross elements replaced by a continuous material such as linen cloth 4 or the like disposed between the strands of the cable along the whole of its length so as to keep the strands apart. If the said material is not solid enough, rigid cross elements may be employed in this construction too. The linen cloth 4 is sewn together in longitudinal seams in the places designated by 5, the said seams retaining the separate cable strands in their due relative positions, and, moreover, serving as a staying means for the cable in its transverse and longitudinal directions.

Figure 5:
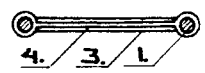
Figs. 5 and 6 illustrate a further embodiment in cross-section and a plan view respectively, the same being adapted for direct current and having the cable strands of circular cross-section.
Figure 6:
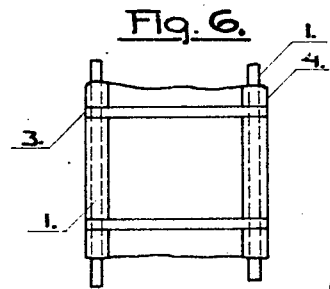

Figs. 5 and 6 illustrate a two pole bare electrical cable for direct current, in which the separate cable strands are of circular cross section, the cable being provided both with cross elements 3 and an intermediate linen cloth 4, which render the cable extremely solid and suitable for its purpose.

In Figs. 7 and 8 an embodiment of the invention is illustrated in which the conductors 1 consist of bare bands, the cross elements 3 however being disposed on one side only. In this embodiment, the cross elements are either made of insulating material, or they may be made of conductive material, but insulated from the strands 1. In this embodiment the electrical conductors may also be enclosed by insulation, and the cross elements can be arranged on both sides of the conductors.

In the embodiment according to Figs. 9–11 the electrical conductors 1 are carried by the cross elements 3 on both sides thereof. This construction has the advantage that uninsulated cable strands may be used in order that the resistance of the cable may be reduced according as the cable is being coiled up on the drum, the turns of the coil being short circuited by the direct contact formed between them.

In the embodiment according to Figs. 12 and 13, the conductors 2 are connected by cross elements 3 which are made of fibre or other suitable non-conducting material and which are secured to the conductors by rivets 14.

The invention is independent of the kind of material used for insulation and for the cross elements, and it is also independent of the number of cable strands employed whether these are to serve for direct or alternating current, and independent of the kind of electrical machines in which the cable is being used.

What I claim as new and desire to secure by Letters Patent of the United States is:

1. In electric tractors, a current supply cable consisting of a plurality of flexible conductors being mechanically but not electrically interconnected at spaced points along the cable by means of rigid cross elements so as to form a rope ladder-like band, suitable to wind on a drum.

2. In electric tractors, a current supply cable consisting of a plurality of flexible band-shaped conductors being mechanically but not electrically interconnected at spaced points along the cable by means of rigid cross elements so as to form a flexible rope ladder-like band, suitable to wind on a drum.

3. In electric tractors, a current supply cable consisting of a plurality of flexible bare, parallel conductors being mechanically but not electrically interconnected at spaced points along the cable by means of rigid cross elements so as to form a flexible rope ladder-like band, a cable drum having two guide flanges, one end of said cable being fixed to said drum and partly wound on the drum, the different conductors being wound in separate winding planes, each conductor having adjacent turns lying on top of each other, and each following turn of each conductor making electric connection with the preceding turn.

In testimony whereof I affix my signature in presence of two witnesses.

ERNST ANDERS GRAFSTRÖM.

Witnesses:
R. H. BEIGROTH,
GRETA PRIEU.